Figure 5:
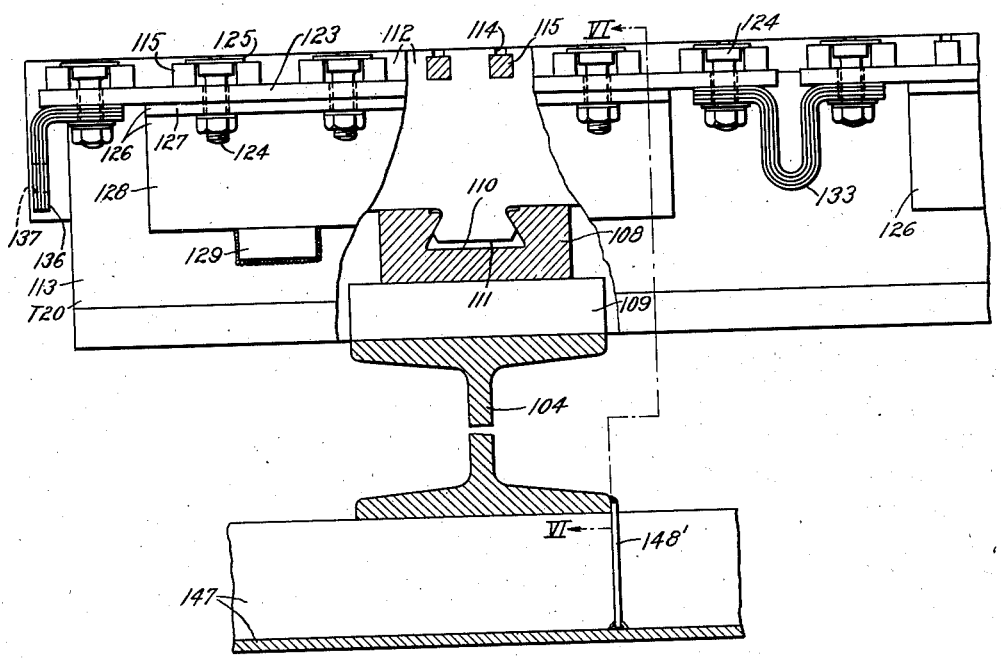

Oct. 7, 1947.  M. F. JONES  2,428,570
LINEAR-MOTOR CATAPULT STRUCTURE
Filed Oct. 14, 1943  3 Sheets-Sheet 1
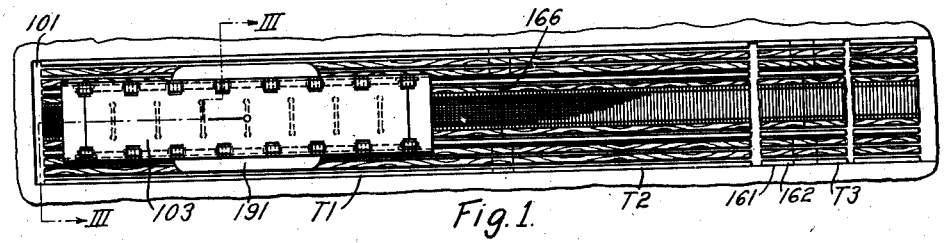
Fig. 1.
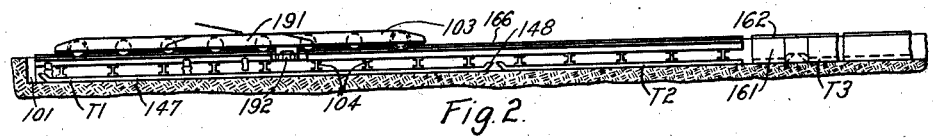
Fig. 2.
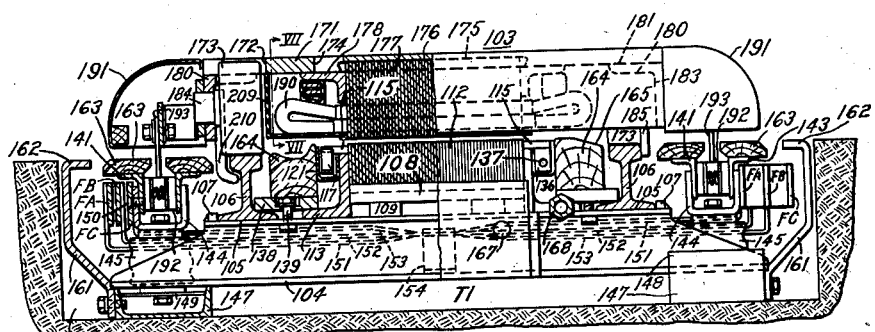
Fig. 3.
Fig. 4.
WITNESSES:
Wm. B. Sellers.
INVENTOR
Maurice F. Jones.
BY O. B. Buchanan
ATTORNEY Oct. 7, 1947.                    M. F. JONES                    2,428,570
                      LINEAR-MOTOR CATAPULT STRUCTURE
                         Filed Oct. 14, 1943          3 Sheets-Sheet 2

WITNESSES:                                              INVENTOR
Wm. B. Sellers.                                     Maurice F. Jones.
                                                   BY O.B. Buchanan
                                                        ATTORNEY Oct. 7, 1947.  M. F. JONES  2,428,570

LINEAR-MOTOR CATAPULT STRUCTURE

Filed Oct. 14, 1943  3 Sheets-Sheet 3

WITNESSES:

INVENTOR
Maurice F. Jones.
BY
ATTORNEY

Patented Oct. 7, 1947

2,428,570

UNITED STATES PATENT OFFICE 2,428,570

LINEAR-MOTOR CATAPULT STRUCTURE

Maurice F. Jones, Wilkinsburg, Pa., assignor to Westinghouse Electric Corporation, East Pittsburgh, Pa., a corporation of Pennsylvania Application October 14, 1943, Serial No. 506,197

16 Claims. (Cl. 172—290)

My invention relates to electric towing-car catapults for aircraft, of the general type which is described and claimed in an application of Frank B. Powers, Serial No. 473,843, filed January 28, 1943, and assigned to the Westinghouse Electric & Manufacturing Company. More particularly, my invention has reference to practical structural details of both elements of the linear motor of such a catapult, that is, both the track-element, including a squirrel-cage core, track-rails, and third-rails, and the towing-car structure, including its special three-phase winding.

An object of my invention is to provide a novel linear-motor construction in which the track-element comprises a plurality of cross-ties which carry the track-rails, the laminated squirrel-cage core, and the insulatedly mounted third-rail structures, one third-rail structure being disposed on each side of the track, and supported, in proper position, from the ends of the cross-ties, so that the entire track-structure is an integral, self-contained unit, not requiring a finished trench or a finished side-wall structure separate from the track, for mounting the third-rail units. The movable element of the linear motor is a polyphase-motored car which cooperates with the aforesaid track-element, and which comprises a laminated polyphase-wound core-structure which is carried between the car-wheels in cooperative relation to the squirrel-cage core-structure of the track. The car also has current-collecting means for engaging the third-rail structures, one on each side of the car, for two of the phases of the power-supply, the third phase being obtained from the track-rails.

A further object of my invention is to provide a track-construction which is made up of prefabricated track-sections, manufactured complete, and ready for assembly in a shallow trough or trench in a landing-field, so that the top of the track-structure will come approximately flush with the level of the landing-field. The track-sections have squared ends which facilitate quickly aligning and drawing together the abutting track-sections. They have track-rail seats and track-rail alignment-means for seating and aligning two track-rails. The third-rail structures, at the two sides of the track-section, are provided with means for making electrical terminal-connections for maintaining the continuity of the third-rail circuits. The individual track-sections are preferably mounted on skids, for quick assembly with the aid of bulldozers. Preferably, the track-rails are twice as long as each track-section, so that the track-rails will serve as means for assisting in properly aligning and holding together the successive track-sections, the rail-joints of the two rails being staggered in the middles of successive track-sections.

Another object of my invention is to provide a prefabricated track-structure including cross-ties which carry seats for the two track-rails, and between the seats, there are core-supporting cross-members, the tops of which are accurately surfaced in a horizontal plane at a predetermined vertical displacement with respect to the track-rail seats. The core-supporting cross-members are provided with dove-tail grooves for receiving the longitudinally disposed, vertical laminations of the track-borne core-element of the linear motor. In this way, the height of the core, with respect to the tops of the track-rails, is very accurately fixed, so as to maintain a fair uniformity of air-gap between the track-borne core and the core-structure which is carried by the car-element of the linear motor.

A further object of the invention is to provide a section of the squirrel-cage track-element with liquid-cooled, high-resistance end-connections for the squirrel-cage bars. Preferably, these end-connections comprise a plurality of loops which extend downward below the bars, and these loops extend down into a trough in which water, or other cooling-liquid is maintained. This construction is particularly needed at the end-section of track, where the car stands prior to takeoff. The length of time during which current flows in the squirrel-cage winding, in other sections of the track, over which the car is moving at considerable speed, is generally so short that water-cooling is not needed, although it may be added, in as many track-sections as may be necessary.

A further object of my invention is to provide special high-resistance, U-shaped, end-connectors, at the ends of the squirrel-cage bars of an induction-motor secondary-member, the U-shaped end-connectors having outwardly bent ends which extend into lateral slots in the sides of the projected ends of the squirrel-cage bars.

A further object of my invention is to provide a squirrel-cage construction having, at each end or side of the squirrel-cage assembly, a plurality of solid-bar end-connectors, each spanning less than all of the squirrel-cage bars, and flexible looped connectors for joining adjacent ends of successive solid-bar connectors. This construction is particularly needed in an extremely long linear-motor squirrel-cage construction, which is laid out in a straight line. The material of the squirrel-cage end-connections is necessarily different from the material of the track, so that the thermal expansions will be different, even if the temperatures remain the same, and the temperatures will not remain the same because the electrical conductors will tend to get hotter, because of resistance-losses. It is necessary, therefore, in any really practical, high-power, linear-motor construction, to provide a harmless manner in which these electrical end-connections of the squirrel-cage structure may expand and contract without producing buckling at ruinous places, and yet this simple fact has apparently been entirely overlooked, in all previous linear-motor constructions utilizing a squirrel-cage track-element, so far as I know.

A still further object of my invention is to provide special supports for the straight, solid-bar end-connectors of the squirrel-cage structure, so that reliance does not need to be placed entirely on silver-soldering between the squirrel-cage bars and their end-connectors, in case the latter should become too hot.

A further object of my invention is to provide a novel form of extremely flat car-element of considerable length, as the moving part of a linear motor. The magnetic attraction-forces between the car-borne core and the track-borne core, in a very long, flat car, are so great that no available car-frame member would be rigid enough to keep the car-core from sagging down into tightly-gripping contact with the track-core, at the center of the car, unless the car-frame were supported, at frequent intervals along the length of the car, by means of car-wheels rolling on the track-rails.

It is an object of my invention to provide such a multi-wheeled car-structure. Preferably only four of these wheels are flanged, a pair of flanged wheels being disposed near the front of the car, and another pair of flanged wheels being disposed near the rear, with a plurality of pairs of broad, unflanged wheels disposed at frequent intervals along the length of the car, at intermediate points, in positions for resting on the respective track-rails. Preferably, the wheel-flanges are disposed on the outside, contrary to ordinary railway practice, so as to minimize the mass or inertia of the car, particularly when the car is utilized as a towing-car for making a quick, accelerating run for launching aircraft.

A further object of my invention is to provide a polyphase-wound linear-motor car, or other primary member of a polyphase machine, said primary member having a limited extent in the direction of relative movement between the movable and stationary members of the machine, characterized by having a plurality of poles, and a plurality of phases, so that the winding consists of as many phase-groups as there are phases times the number of poles, each phase-group consisting of the same number of coils connected in series, to make up that phase-group, except the end phase-group which comes at each end of the core-structure. According to my invention, each of these end phase-groups has a larger number of coils connected in series with each other, to make up that end phase-group. The reason for this construction is that the end phase-groups have less magnetizable material in their vicinity, and thus link less magnetic flux, and hence have a lower impedance per coil, than the phase-groups which are disposed away from the ends of the core-structure. The additional number of coils in the end phase-groups approximately compensates for this difference in impedance per coil, and operates satisfactorily, notwithstanding the fact that the synchronous speed of the end phase-groups is greater than the synchronous speed as determined by the pole-pitch of the normal or intermediate phase-groups, where the intermediate phase-groups each contain, say, three coils per group, whereas the end phase-groups contain, say, four coils per group.

Figure 6:
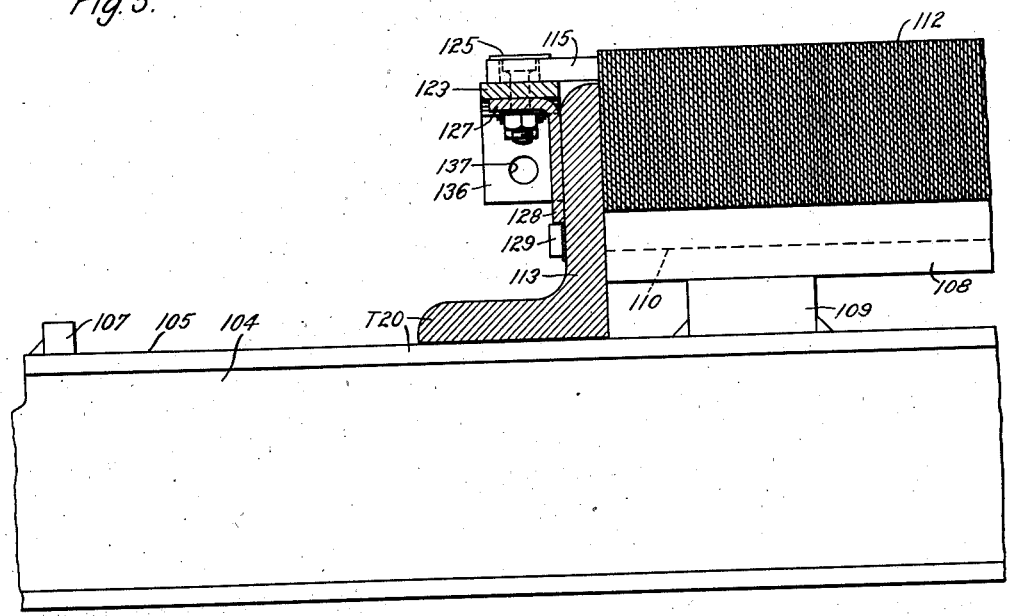
Figure 7:
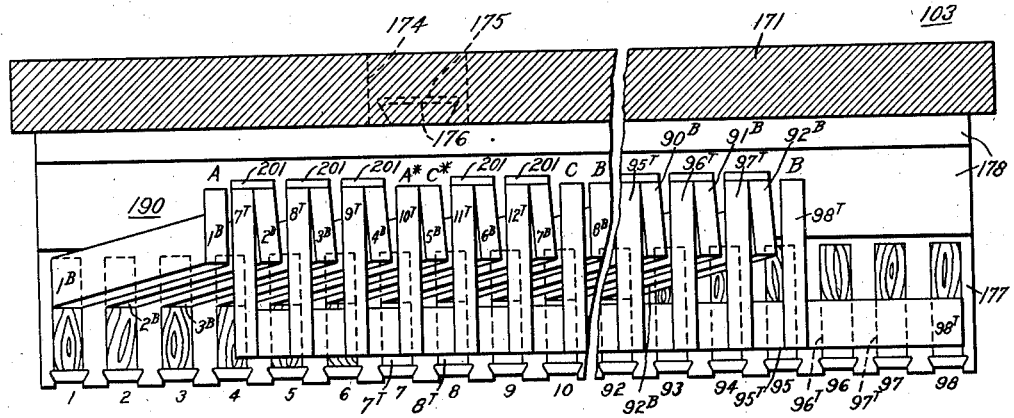
Figure 8:
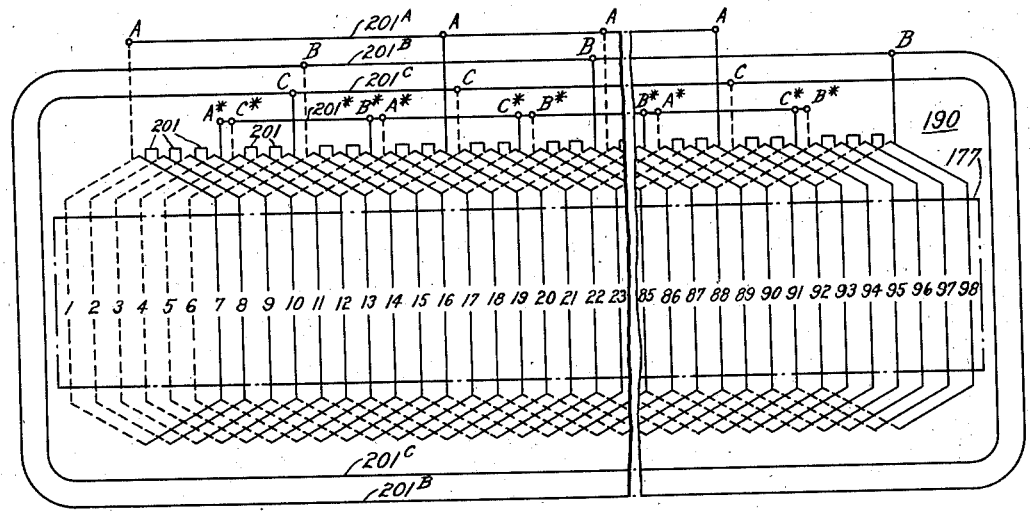

With the foregoing and other objects in view, my invention consists in the combinations, systems, methods, structures, and elements hereinafter described and claimed, and illustrated in the accompanying drawing, wherein Figure 1 is a longitudinal plan-view of a portion of a landing or launching field, with my linear-motor catapult installed, Fig. 2 is a side view thereof, showing the track-element of the linear motor, installed in a trench or shallow ditch dug in the flying-field, Fig. 3 is an end view of the linear-motor, including both the car-element and the track element in a trough in the flying-field, with half of the equipment shown in transverse section, as indicated by the section-line III—III in Fig. 1, Fig. 4 is a perspective view of a corner of the junction between two track-sections, before the addition of the track-rails, and before the addition of the junction cover-pieces, Fig. 5 is a side-elevational view showing the end-connections of a track-section which has a low-resistance squirrel-cage assembly, Fig. 6 is a transverse sectional view thereof, along the section-plane indicated by the line VI—VI in Fig. 5, Fig. 7 is a longitudinal sectional view of the car-element, along the line VII—VII of Fig. 3, showing a somewhat idealized end-view of the polyphase primary windings of the car, omitting the wiring around the frame, and Fig. 8 is a bottom-plan wiring-diagram of the car-windings shown in Fig. 7, including the wiring around the frame.

As shown in Figs. 1 and 2, the track-element is laid in a shallow ditch or trough 101, in a landing-field or launching-field, so that the top of the track will come approximately flush with the surface of the landing-field. The track-element, as illustrated, is made up in the form of a plurality of at least partially prefabricated track-sections T1, T2, T3, etc., said track-sections having squared-off abutting ends 166 which are joined together in a straight line. The movable element of the linear motor is a low, flat, elongated, polyphase-motored towing-car 103, which rides on the track-element.

As shown in Figs. 2 and 3, each track-section T1, T2, etc., comprises a plurality of cross-ties 104, which are shown in the form of steel H-beams. The top flange of each cross-tie 104 has two track-rail seats 105, for receiving the two track-rails 106, respectively. Preferably, the track-rail seats 105 are bordered, on the outside, by abutments 107 which are carried by the cross-ties for determining the alignment or spacing of the track-rails 106. Between the two track-rail seats 105, each cross-tie 104 carries a core-supporting cross-member 108, which is mounted on the top of the cross-tie, as by means of supporting-blocks 109.

As shown in Fig. 5, each of the core-supporting cross-members 108 has a dovetailed groove 110 cut in its upper surface, for receiving a dovetailed tenon 111 of a plurality of vertical, longitudinally extending magnetizable laminations which constitute a laminated core-member 112. The core-laminations 112 are clamped together, at each end of the stack of laminations, that is, along each side of the core, by means of one of two angle-iron clamping-pieces 113 which are secured to the top flanges of the several cross-ties 104 which make up that track-section. The core-clamping angle-pieces 113 thus constitute longitudinally extending members, extending longitudinally of the track, and rigidly joining together the various cross-ties 104 of each prefabricated track-section. The laminated core 112 of each track-section has a plurality of transversely extending slots 114 therein, which receive squirrel-cage bars 115.

In the fabrication of the track-section, the track-rail seats 105 are used as the seating-points of a jig (not shown) which makes it possible to accurately surface or machine the top of the core-supporting cross-member 108 of each cross-tie, so as to be at a predetermined vertical displacement with respect to the rail-seats, so that, when the core-laminations 112 are added to the core-supporting cross members 108, and when the track-rails 106 are placed upon the rail-seats, the top of the laminated core will be at an accurately fixed and constant level with respect to the top of the track-rails, thus contributing materially to the maintenance of a fixed airgap-length between the core-member of the track and the core-member of the towing-car which will be substantially described.

The squirrel-cage bars 115 are joined, at their respective ends, by suitable end-connector means. As described and claimed in the Powers application, a relatively small number of track-sections, near each end of the entire track-system, are provided with high-resistance squirrel-cage end-connections, while the large number of track-sections which constitute the main portion of the track have low-resistance end-connections for the squirrel-cage winding.

The high-resistance squirrel-cage end-connections are shown in Figs. 3 and 4. Each of the squirrel-cage bars 115 has its respective ends extending beyond an end or side of the laminated core 113, and the high-resistance end-connections are in the form of U-shaped loop-members 117, which extend down below the levels of the squirrel-cage bars 115. Preferably, the tops of the U-shaped end-connectors 117 have outwardly bent ends 118 which are secured in lateral slots 119 which are formed in the sides of the extending ends of the squirrel-cage bars 115.

The terminal track-section T1 or any other track-section on which the towing-car 103 is likely to rest, prior to takeoff, is preferably provided with liquid cooling-means, illustrated, in Figs. 3 and 4, in the form of a water-trough 121 into which the looped end-connections 117 dip, in order to prevent the overheating of the end-connections to a temperature high enough to melt the silver-soldered connections with the squirrel-cage bars, or otherwise damaging the end-connections.

The low-resistance squirrel-cage end-connections, which are utilized for all of the intermediate track-sections, such as the track-sections T20, are shown in Figs. 5 and 6. The extending ends of the squirrel-cage bars 115 are silver-soldered to heavy copper end-connectors 123, which lie underneath the ends of the bars 115. In addition to having a soldered connection to the bars 115, the end-connectors 123 are preferably also connected to the bars 115 by means of bolts 124, or other mechanical clamping-means, illustrated in the form of bolts which have large flat heads 125 which span the space between two of the squirrel-cage bars 115 so as to bolt two bars, at once, to the end-connector 123.

As a still further means for mounting the end-connectors 123, we preferably also utilize a plurality of angle-bar supports 126, each having a horizontal top flange 127 underlying its associated portion of an end-connector 123, and having also a vertical flange 128 which is seated on shoulders 129, or other support-means, carried by the core-clamping angle-piece 113 of the track section. In the particular form of embodiment which is illustrated in Figs. 5 and 6, the clamping-bolts 124 of the squirrel-cage bars pass down also through the underlying top flange 127 of the angle-bar support 126, securing this support to the squirrel-cage bars 115 and to the intervening end-connection bar 123.

The lower edge of the angle-bar support 126 preferably merely rests on the tops of the supporting-projections 129, so that the angle-bar 126 is free to slide outwardly when the squirrel-cage bars 115 expand in response to their heating, when they are carrying heavy currents. However, the vertical flange 128 of the angle-bar 126 may also be sufficiently thin so that it will flex sufficiently to take care of any expansion of the squirrel-cage bars 115, without overcoming the sliding-friction between the lower edge of the vertical flange 128 and the tops of the supports 129. In this manner, the end-connectors 123 are held up tightly against the projecting ends of the squirrel-cage bars 115, so as to safeguard abundantly against any possibility of the end-bars 123 dropping out of good electrical engagement with the squirrel-cage bars 115.

It is a feature of my invention that the solid-bar end-conductors 123, at the respective ends of the squirrel-cage bars 115, do not extend uninterruptedly along the entire length of the track-assembly, and preferably not even along the entire length of any individual track-section, such as the track-section T20 which is illustrated in Fig. 5. These end-connectors 123 are subject to heating, as a result of the heavy electrical currents which they carry, at times, and this heating would result in very damaging buckling, and breakage of some of the parts and connections, if adequate provision were not made therefor. Since the ends of the squirrel-cage bars 115, which project out beyond the ends or sides of the core-structure 112, have a certain small amount of flexibility, which will enable them to follow a small amount of longitudinal expansion and contraction of the end-connectors 123, it is neither necessary nor desirable to provide for thermal expansion and contraction of the end-connectors 123 between each pair of squirrel-cage bars 115.

I have accordingly devised a novel low-resistance end-bar assembly for the squirrel-cage bars 115, in which I utilize, on each side of the squirrel-cage core 112, or at each end of the squirrel-cage bars 115, a plurality of solid-bar connectors 123, each solid-bar connector spanning a group of less than all of said extending ends of the squirrel-cage bars 115. Each solid-bar connector 123 is rigidly connected to all of the squirrel-cage bar-ends with which it is associated, and flexible, looped, connectors 133 are provided for connecting the adjacent ends of successive solid-bar connectors 123. Each flexible, looped, connector 133 comprises a plurality of pieces of thin conductors or laminations, each having a thickness less than that of the solid-bar connectors, so as to make the flexible, looped, connectors 133 quite flexible. These flexible, looped, connectors 133 are illustrated as being secured by two of the bolts 124 which join the respective ends of the solid-bar connectors 123 to the squirrel-cage bar-ends 115.

At each end of each of the track-sections, as shown in Fig. 5, and on the right-hand side of Fig. 3, a flexible electrical connector 136 is provided, for continuing the end-connections of the squirrel-cage winding from one track-section to the next. As shown in Fig. 5, this flexible end-connection 136 is also preferably laminated, or made up of a plurality of pieces of thin conductors, the same as the loop-connections 133. The flexible end-connections 136 are provided with holes 137 for bolting on to the corresponding end-connector of the next track-section.

While I have referred to the intermediate or centrally disposed track-sections (such as T20) as having low-resistance squirrel-cage secondary-windings 115—123, it is to be understood that the term low-resistance is used merely to distinguish from the higher resistance of the squirrel-cage windings on the track-sections at the end of the track. The resistance of the so-called low-resistance squirrel-cage windings 115—123 actually corresponds to a slip of 12% at full load, in a practical embodiment of my invention. However, if a non-linear or rotating induction motor had this much slip, it would not ordinarily be referred to as having a particularly low-resistance secondary winding.

Each track-section T1, T2, etc., also carries, as a prefabricated part thereof, a plurality of insulatedly mounted third-rail structures, one on each side of the track, outside of the respective track-rails 106. In the illustrated form of the invention, each third-rail structure is in the form of two angle-iron rails 141, having vertical flanges 142 which are spaced from each other, and having top-flanges 143 which extend out away from the space between the two vertical flanges 142. The pair of third-rails 141, on each side of the track-structure, is mounted on a plurality of U-shaped supporting-brackets 144 which are supported on insulators 145 which are, in turn, supported from the cross-ties 104 of the track-section.

In the illustrated form of embodiment of the invention, the cross-ties 104 of each track-section are mounted on channel-sectioned skids 147, the ends of which are turned up, as indicated at 148, to facilitate hauling the various track-sections into place on the landing-field.

Because the channel-sectioned skids 147 are not subject to the same temperature-changes as the electrically heated core 112 of the track, they are secured to the several cross-ties 104, or to some of the cross-ties, in such manner as to admit of a certain small amount of relative movement or displacement, longitudinally of the skids 147, so as to prevent bowing of the track-sections. Thus, as shown in Fig. 5, some or most of the cross-ties 104 may be joined to the channel-shaped skids 147 by means of thin vertical plates or webs 148' which are flexible in the direction corresponding to the length of the skids 147.

As shown in Fig. 3, the channel-member skids 147 also constitute a convenient abutment for the lower ends of the third-rail insulators 145, which are shown, in Fig. 3, as being mounted on plates 149 secured within the channel-member skids 147, thus being supported from the bottoms of the cross-ties 104, to which the skids are connected.

As more particularly described and claimed in an application of Lee A. Kilgore and myself, Serial No. 506,198, filed October 14, 1943, patented December 11, 1946, No. 2,412,512, each track-section has two sets of three three-phase feeder-conductors FA, FB and FC, extending the entire length of the track-section, a complete set of three feeders being disposed along each side of the track-section, outside of the respective third-rail structures 141. Preferably, the feeder-conductors FA, FB and FC are flat, vertically disposed strips of copper or other non-magnetizable conductors, having their flat sides closely spaced from each other, in order to reduce the reactance. The extreme ends of the feeders FA, FB and FC of each track-section may be bent out a little further apart from each other, in order to facilitate the making of electrical end-connections from one track-section to the next.

The phase-conductor FA of the three-phase feeder-assembly FA, FB and FC on one side of the track-section is disposed adjacent to the outer rail 141 of the third-rail assembly on that side of the track-section, and is electrically and mechanically secured thereto, at a plurality of points, as by being bolted by the same bolts or screws 150 which secure the U-shaped supporting-brackets 144 to the third-rails 141. On the other side of the track-section, another phase, indicated by the phase-conductor FC of the feeder-assembly FA, FB and FC, is disposed adjacent to its corresponding outer third-rail 141, and similarly secured thereto at a plurality of points.

At a plurality of points along the entire track, preferably once for each of the track-sections T1, T2, T3, etc., a set of three three-phase cross-connectors 151, 152 and 153 are disposed underneath the track-rails 106 and the track-core 112, for connecting the corresponding phases of the two feeder-assemblies FA, FB and FC on the two sides of the track. Preferably, each set of three three-phase cross-connectors 151, 152 and 153 consists of flat strips of non-magnetizable conducting material, disposed with their flat sides horizontal, and lying one above the other in closely spaced relation, except that the top and bottom conductors 151 and 153 are transposed, somewhere in the center of the track-section, so that they may be conveniently connected to the inner and outer phase-conductors of the two sets of feeders FA, FB and FC on the two sides of the track-section. The intermediate cross-connector 152, which is connected to the two intermediate phase-conductors FB of the two sets of feeders, is centrally connected, by means of a strip-conductor 154, to the bottom flange of one of the cross-ties 104, and thence to the two track-rails 106 which are supported by the top flange of said cross-tie.

A special rail-fastening means is shown, in Fig. 3, for securing the two track-rails or running-rails 106 to the several cross-ties 104, with the outer edges of the bottom flanges of the rails in contact with the rail-aligning abutments 107. This special rail-fastening means includes a plate-like member 138 having one edge which is engageable at the junction between the rail-web and the base-flange of the rail, at the side of each track-rail opposite to the side which is engaged by said abutment 107. The plate-like member 138 is drawn down tightly toward the cross-tie 104 by means of a bolt or screw 139, which forces the rail into tight engagement with both the rail-seat 105 and the abutment 107 at the top of the cross-tie 104. This provides a simple and effective fastening-means whereby the track-rails 106 may be quickly fastened into place, with a minimum of lost motion, when the track-sections are assembled in the field.

As shown in Fig. 3, each track-section is also provided with lateral guard-members 161 which are carried by the track-section supporting-structure, as, for example, by the two skid-members 147, for guarding the track-section while it is being put into place within its trough 101 in the flying-field, and also to prevent dirt and rubble from falling into the track-section from the sides of the trough. The two guard-members 161 have inwardly turned top-flanges 162 which are substantially flush with the top of the flying-field.

The top surfaces of all of the parts of the entire track-structure are preferably substantially flush with the level of the flying-field. The tops of the two third-rails 141 of each of the third-rail assemblies, four rails in all, are preferably covered and protected by wooden or other insulating cap-strips 163, the tops of which are approximately flush with the landing-field. The tops of the track-rails 106 are also preferably approximately flush with the landing-field. The top of the squirrel-cage core 112 is also approximately flush or level with the flying-field, but preferably very slightly higher than the flying-field, as indicated in Fig. 3.

Preferably, also, two wooden beams or other insulating fillers 164 are utilized, to partially fill the space between the end of the squirrel-cage winding and the inner sides of the rail-heads of the two track-rails 106, in each track-section. Since the track-core 112 is very slightly higher than the level of the rail 106, the top surface of the wooden block 164 may be slightly inclined, as indicated at 165.

The ends of the track-sections T1, T2, etc., are squared off, as shown at 166 in Figs. 1 and 4, and aligned by means of dowel-pin joints 167, as shown in Fig. 3, the successive sections being tightly drawn together by means of turnbuckles 168 which engage notches 169 which are cut in the bottom flanges of the core-clamping angle-irons 113 of the frame-structures of the several track-sections, as shown more clearly in Fig. 4.

The towing-car 103, which rides on the track-element of the linear motor, as shown in Figs. 1, 2, 3 and 7, comprises a long flat top-plate 171 which is provided with a large number of lateral notches 172 for receiving a large number of wheels 173. It is also provided with a number of pairs of holes 174, between which is machined, on the underside, a number of transversely extending dovetail grooves 175 for receiving dovetail tenons 176 of a large number of vertical, longitudinally extending laminations or magnetizable core-punchings 177 which make up the primary-winding core 177 of the linear motor. The stack of laminations 177 of the primary-winding core are clamped in place by means of two, longitudinally extending angle-irons 178 which are secured to the underside of the top-plate 171.

Extending longitudinally along the lateral edges of the top-plate 171, on the underside of said plate, are two side-pieces in the form of angle-irons 180 having top-flanges 181 which are notched to coincide with the top-plate notches 172, to receive the wheels 173. Each side-strip angle-piece 180 is also provided with a vertical flange 183 which carries inwardly extending stub-shafts 184 on which the car-wheels 173 are journalled.

The car wheels 173 are disposed, at frequent intervals, along the length of the car 103, and are provided with broad rims which roll on the tops of the track-rails 106. Most of the wheels are unflanged, but the four wheels at the front and rear of the car are provided with flanges 185 which, contrary to usual railway practice, are on the outside of these guide-wheels, so as to engage the outer edges of the rail-heads of the track-rails 106.

The reason for utilizing a large number of wheels 173, spaced at frequent intervals along the length of the car 103, is to prevent the sagging of the elongated car-frame under the very heavy magnetic attractive forces which occur between the car-core 177 and the track-core 112 when electric power is applied. Without the large number of fairly closely spaced wheels 173, the car-frame would sag, under the magnetic attraction, at points spaced from the wheels, thus permitting the two cores 177 and 112 to come into contact with each other, or else entailing the use of an airgap (between the cores) which is too long to be at all practicable, or else requiring the use of a plurality of very short cars which would not have a very efficient traveling magnetic field therein, because the car-length would be insufficient to include a large number of pole-pitches.

The reason for providing the wheel-flanges 185 on the outer sides of the leading and trailing wheels 173, instead of the usual practice of placing the flanges on the inner sides of the wheels, is to save the slight additional amount of mass or inertia which would be required if the car-frame were made just a trifle wider, in order to allow for the thickness of wheel-flanges disposed on the inner sides of the wheels. In the particular application of the invention which is illustrated, the matter of inertia was considered to be sufficiently important to justify the use of outside-flanged wheels at the front and rear ends of the car.

The primary core 177 which is carried by the car is provided with a three-phase primary winding 190, which is shown in Fig. 3, and which is shown, in more detail, in Figs. 7 and 8.

The towing-car 103 is also provided with two current-collecting mechanisms, enclosed in housings 191 disposed one on each side of the car. Each of the current-collecting mechanisms comprises a plurality of third-rail shoes 192 which are carried by the downwardly extending plows or support-members 193 which extend through slots between the pair of cap-strips 163 at each side of the track, so that the two sets of third-rail shoes 192, on the two sides of the car 103, engage the two pairs of third-rails 141, one pair on each side of the track. In this manner, two of the phases of the three-phase supply are led into the primary windings 190 of the car, the third phase being obtained from the track-rails 106 in a manner which is common railway practice. The special collector-shoe design, which was developed for the purpose of handling the unprecedently high currents which had to be collected, constitutes the subject-matter of my application, Serial No. 506,199, filed October 14, 1943.

As shown more in details in Figs. 7 and 8, the primary core 177, which is carried by the car 103, is provided with ninety-eight slots, numbered consecutively from 1 to 98. The six end-slots at each end of the core, that is, slots numbered 1 to 6 and 93 to 98, respectively, are only half filled, so that there are only ninety-two coils to the winding. The winding is a ten-pole, three-phase winding, divided into phase-groups, one phase-group for each phase and for each pole. In each phase-group except the two phase-groups at the two ends of the core, there are three coils connected in series, the series-connections being shown at 201 in Figs. 7 and 8. The two end phase-groups, one at each end of the core, each consist of four coils connected in series, as can be seen from the use of three of the end-connections 201 between the successive coils of the four coils at each end of the winding, in Figs. 7 and 8.

In Fig. 7 the coil-sides which are disposed in the tops of the slots, or in the portion of the slot closest to the airgap, are indicated by the slot-number, with the addition of the superscript T. These are the coil-sides $1^T$ to $98^T$, respectively, the coil-ends being designated by the same designations as the coil-sides. In the same figure, the coil-sides which are disposed in the bottoms of the slots, or which are put first in the slots, are designated by the slot-number, with the addition of the superscript B. These are the coil-sides $1^B$ to $92^B$, respectively, the ends of the coil-sides having the same designations as the coil-sides themselves. In Fig. 8, the top coil-sides and end-connections are indicated by full lines, and are designated only by the slot-numbers, while the bottom coil-sides and end-connections are indicated in dotted lines, in accordance with a known convention.

In the illustrated winding, the corresponding phases of the ten poles are all connected in parallel, to provide a multiple-star winding, by means of phase-connectors, or around-the-frame windings, $201^A$, $201^B$, $201^C$ and $201^*$, as shown in Fig. 8.

By way of example, the first phase-group of the primary winding, in Figs. 7 and 8, is a phase-A group, consisting of four coils connected in series, which may be traced as follows. Starting with the phase-A power-conductor, this winding-group may be traced through the bottom coil-side $1^B$ in slot 1, the top coil-side $7^T$ in slot 7, the first end-winding connector 201, the bottom coil-side $2^B$, the top coil-side $8^T$, the second end-winding connector 201, the bottom coil-side $3^B$, the top coil-side $9^T$, the third end-winding connector 201, the bottom coil-side $4^B$, and the top coil-side $10^T$, to the star-winding connector $201^*$, which is also designated $A^*$. In like manner, the last winding-group also consists of four coils in series, which may be traced from the phase-B conductor B through the top coil-side $98^T$, and thence on through to the dotted-line bottom-coil end-connection 89 in Fig. 8, and thence to the star-point conductor $201^*$, at the point $B^*$. All of the other phase-groups or winding-groups of the primary winding are three-coil groups, as plainly indicated in Figs. 7 and 8.

The reason for utilizing the extra coil in the end winding-groups is to compensate for the additional magnetic reluctance at the ends of the primary core 177, due to the fact that the core breaks off and is not continuous, as in an ordinary winding, resulting in a lower impedance per coil. In this manner, I am enabled to keep the three phases of the power-supply fairly well balanced, and I also avoid excesssive overheating of the end phase-groups of the winding.

As shown in Fig. 3, the end-turns of the polyphase winding 190 of the car may be protected by a shield or guard 209.

As further shown in Fig. 3, the side-pieces 180 of the car carry downwardly depending safety-straps 210 which hook under the rail-heads of the track-rails 106 in spaced relation thereto, but in such position as to bias against the undersides of the rail-heads and prevent the car from jumping the track, if there should be any such tendency.

The operation of the invention has been indicated throughout the progress of the description, so that it is believed that it will be readily understood, without further summarizing. While I have illustrated my invention in a single preferred form of embodiment, I desire it to be understood that this embodiment is only by way of illustration, and that my invention, in its broader aspects, is susceptible of many changes by way of addition, simplification, and substitution of equivalents. I desire, therefore, that my appended claims shall be accorded the broadest construction consistent with their language.

I claim as my invention:

1. A track-element of a polyphase linear-motor catapult for launching aircraft from a landing-field, said track-element being adapted to lie approximately flush in a trough in the landing-field and comprising a plurality of track-sections, characterized by each track-section comprising a supporting-structure and being squared at the ends for abutting with the next track-section, means for aligning and drawing together the abutting track-sections, said supporting-structure of each track-section comprising a plurality of cross-ties, a plurality of longitudinally extending skids on which said cross-ties are supported, said skids having upturned ends, said cross-ties having track-rail supporting-means for supporting two track-rails, a laminated squirrel-cage core-structure connected to said cross-ties between said track-rail supporting-means, a third-rail structure at each side of each track-section, outside of the track-rail supporting-means, insulators for supporting said third-rail structures from said supporting-structure, and lateral guard-members carried by the supporting-structure for laterally guarding the equipment.

2. A track-element of a polyphase linear-motor catapult for launching aircraft from a landing-field, said track-element being adapted to lie approximately flush in a trough in the landing-field and comprising a pair of track-rails, a plurality of cross-ties having track-rail supporting-means for supporting said track-rails, a laminated squirrel-cage core-structure supported by said cross-ties between said track-rails and in spaced relation to said track-rails, a filler-member carried by said cross-ties along each side of the core-structure between the core-structure and the track-rail on that side, a third-rail structure at each side of said track-element, outside of the track-rails, each third-rail structure comprising two spaced third-rails facing each other, and a plurality of U-shaped supports for supporting said two third-rails of each third rail structure, insulators for supporting said third-rail structures from said cross-ties, and an insulating cap-strip over each of the four third-rails; the top surfaces of the insulating cap-strips, the track-rails, the filler-members and the core-structure being approximately flush with the surface of the landing-field.

3. A track-element of a polyphase linear motor, comprising a plurality of at least partially prefabricated track-sections, each track-section comprising a supporting-structure and being squared at the ends for abutting with the next track-section, means for aligning and drawing together the abutting track-sections, said supporting-structure of each track-section comprising a plurality of cross-ties, said cross-ties having track-rail supporting-means for supporting two track-rails, a plurality of said cross-ties having core-supporting cross-members disposed within the space between the two track-rail supporting-means, the tops of the core-supporting cross-members being accurately surfaced in a horizontal plane at a predetermined vertical displacement with respect to the track-rail supporting-means, a plurality of vertical, longitudinally extending laminations dove-tailed onto said core-supporting cross-members, abutment-means for clamping said laminations together, and electric winding-means carried by said laminations for constituting one of the core-members of a polyphase linear motor.

4. The invention as defined in claim 3, the rail-joints occurring, in general, at some intermediate point in some track-section.

5. The invention as defined in claim 3, in combination with track-rails which are in general long enough to span at least approximately two track-sections, the rail-points occurring, in general, at some intermediate point in some track-section.

6. A linear motor comprising a squirrel-cage track-element and a polyphase-motored car cooperating therewith; said track-element comprising a pair of track-rails, a laminated squirrel-cage core-structure carried by said track-element between said track-rails, at least a portion of said squirrel-cage core-structure having high-resistance end-connections, a trough adapted to receive a cooling-liquid for bathing at least some of said high-resistance end-connections, at least the trough-equipped track-portions having approximately level track-rails, and a plurality of third-rail structures carried by said track-element; said car comprising wheels engaging said track-rails, a laminated polyphase-wound core-structure carried by said car between said wheels and in cooperative relation to said squirrel-cage core-structure, and current-collecting means for engaging said third-rail structures.

7. A squirrel-cage track-element of a polyphase linear motor, comprising a pair of track-rails, a laminated core carried by said track-element between said track-rails, a plurality of squirrel-cage bars extending through the core and having extending ends beyond the core, a high-resistance end-connection for at least some of said squirrel-cage bars at each end of said bars, each high-resistance end-connection comprising a plurality of loops extending down below the bars, means for securing the tops of the loops to the extending ends of the bars, and a trough adapted to receive a cooling-liquid for bathing at least some of said loops, at least the trough-equipped track-portions having approximately level track-rails.

8. An induction motor comprising a wound primary member and a squirrel-cage secondary member, said squirrel-cage secondary member comprising a laminated core, a plurality of squirrel-cage bars extending through the core and having extending ends beyond the core, a plurality of solid-bar connectors for the extending ends of the squirrel-cage bars at each side of the core, each solid-bar connector spanning a group of less than all of said extending ends, means for securing each solid-bar connector to the extending ends of its associated squirrel-cage bars, and flexible, looped connectors connecting the adjacent ends of successive solid-bar connectors, each flexible, looped connector comprising a plurality of pieces of thin conductors each having a thickness less than that of the solid-bar connectors.

9. A squirrel-cage track-element of a polyphase linear motor, comprising a pair of track-rails, a laminated core carried by said track-element between said track-rails, a plurality of squirrel-cage bars extending through the core and having extending ends beyond the core, a plurality of straight solid-bar connectors for the extending ends of the squirrel-cage bars at each side of the core, each solid-bar connector spanning a group of less than all of said extending ends, means for securing each solid-bar connector to the extending ends of its associated squirrel-cage bars, and looped connector-portions between successive straight solid-bar connectors.

10. The invention as defined in claim 9, in combination with angle-bar supports for a plurality of the straight solid-bar connectors, each angle-bar support having a horizontal top-flange underlying its associated assembly of squirrel-cage extending ends and their straight solid-bar connector, each angle-bar support having also a vertical flange, and support-means carried by the track-element for supporting a lower portion of said vertical flange.

11. A linear motor comprising a squirrel-cage track-element and a flat, elongated, polyphase-motored car cooperating therewith; said track-element comprising a pair of track-rails, and a laminated squirrel-cage core-structure supported by said track-element between said track-rails; said car having a pair of flanged wheels near each end thereof for engaging said track-rails, the flanges of said flanged wheels engaging only the outer sides of the respective track-rails, a plurality of pairs of wheels distributed along the length of the car between the end pairs of flanged wheels, and a laminated polyphase-wound core-structure carried by said car between said wheels and in cooperative relation to said squirrel-cage core-structure.

12. A linear motor comprising a squirrel-cage track-element and a flat, elongated, polyphase-motored car cooperating therewith; said track-element comprising a pair of track-rails, and a laminated squirrel-cage core-structure supported by said track-element between said track-rails; said car comprising a flat top-plate, a plurality of wheels supported by said top-plate at spaced intervals along its length, in positions to engage said track-rails, and a laminated polyphase-wound core-structure carried by the underside of said flat top-plate between said wheels and in cooperative relation to said squirrel-cage core-structure, said core-structure comprising a plurality of vertical, longitudinally extending laminations having dove-tail tenons extending beyond their upper edges at spaced points, the bottom surface of said flat top-plate having dove-tail grooves in which said tenons are engaged, abutment-means carried by the underside of said flat top-plate for clamping said laminations together, and polyphase electric windings carried by said laminations for constituting the primary windings of the linear motor.

13. A linear motor comprising a squirrel-cage track-element and a flat, elongated, polyphase-motored car cooperating therewith; said track-element comprising a pair of track-rails, and a laminated squirrel-cage core-structure supported by said track-element between said track-rails;

said car comprising a flat top-plate, two longitudinal angle-structure side-pieces, each side-piece having a vertical flange and a top horizontal flange extending inwardly therefrom, means for securing the top horizontal flange of each side-piece to the underside of said flat top-plate, a plurality of inwardly extending stub-shafts carried by the vertical flange of each side-piece at spaced intervals along its length, wheels journalled on said stub-shafts in positions to engage said track-rails, the flat top-plate and the top horizontal flanges of said side-pieces being notched at a plurality of points to clear a plurality of said wheels, and a laminated polyphase-wound core-structure carried by the underside of said flat top-plate between said wheels and in cooperative relation to said squirrel-cage core-structure.

14. A linear motor comprising a squirrel-cage track-element and a flat, elongated, polyphase-motored car cooperating therewith; said track-element comprising a pair of track-rails, and a laminated squirrel-cage core-structure supported by said track-element between said track-rails; said car having wheels engaging said track-rails, and a laminated polyphase-wound core-structure carried by said car between said wheels and in cooperative relation to said squirrel-cage core-structure, said polyphase-wound core-structure having polyphase multipolar primary linear-motor windings comprising NP phase-groups, where N is the number of phases, and P is the number of poles, each phase-group consisting of the same number of coils connected in series to make up that phase-group, except the end phase-group of the phase which comes at each end of the core-structure, each of said end phase-groups having a larger number of coils connected in series to make up that end phase-group.

15. A polyphase machine having a movable member and a stationary member, one of said members being a polyphase-wound primary member of limited extent in the direction of relative movement of the two members, said polyphase-wound primary member having a laminated core and a polyphase primary winding carried thereby, characterized by said winding comprising a plurality of phase-groups, each phase-group consisting of the same number of coils connected in series to make up that phase-group, except the end phase-group of the phase which comes at each end of the core, each of said end phase-groups having a larger number of coils connected in series to make up that end phase-group.

16. A track-element of a polyphase linear-motor catapult for launching aircraft from a landing-field, said track-element being adapted to lie approximately flush in a trough in the landing-field and comprising a pair of track-rails, a plurality of cross-ties having track-rail supporting-means for supporting said track-rail, a laminated squirrel-cage core-structure supported by said cross-ties between said track-rails and in spaced relation to said track-rails, a filler-member carried by said cross-ties along each side of the core-structure between the core-structure and the track-rail on that side, a third-rail structure at each side of said track-element, outside of the track-rails, insulators for supporting said third-rail structures from said cross-ties, cap-strips associated with the third-rail structure, the top surfaces of the cap-strips, the track-rails, the filler-members and the core-structure being approximately flush with the surface of the landing-field.

MAURICE F. JONES.

REFERENCES CITED

The following references are of record in the file of this patent:

UNITED STATES PATENTS

| Number | Name | Date |
|---|---|---|
| 2,412,511 | Jones | Dec. 10, 1946 |
| 1,678,912 | McLeod et al. | July 31, 1928 |
| 1,093,069 | Nilson | Apr. 14, 1914 |
| 92,314 | Jones | July 6, 1869 |
| 1,916,491 | Rose | July 4, 1933 |
| 1,376,279 | Jacobs | Apr. 26, 1921 |
| 1,148,051 | Rhinesmith | July 27, 1915 |
| 1,784,815 | Apple | Dec. 16, 1930 |

FOREIGN PATENTS

| Number | Country | Date |
|---|---|---|
| 470,767 | Great Britain | Aug. 20, 1937 |